(12) United States Patent
Kim et al.

(10) Patent No.: US 12,304,290 B2
(45) Date of Patent: May 20, 2025

(54) VEHICLE SIDE STRUCTURE

(71) Applicants: HYUNDAI MOTOR COMPANY, Seoul (KR); KIA CORPORATION, Seoul (KR)

(72) Inventors: Eon Pyo Kim, Seoul (KR); Sang Gil Choi, Seoul (KR); Soel Ki Choi, Icheon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 318 days.

(21) Appl. No.: 17/973,208

(22) Filed: Oct. 25, 2022

(65) Prior Publication Data
US 2024/0001741 A1 Jan. 4, 2024

(30) Foreign Application Priority Data
Jul. 4, 2022 (KR) ........................ 10-2022-0081938

(51) Int. Cl.
*B60J 5/04* (2006.01)

(52) U.S. Cl.
CPC ........... *B60J 5/0437* (2013.01); *B60J 5/0444* (2013.01)

(58) Field of Classification Search
USPC ............................................ 296/146.6, 146.7
See application file for complete search history.

(56) References Cited

U.S. PATENT DOCUMENTS

| | | | | |
|---|---|---|---|---|
| 5,800,007 | A * | 9/1998 | Cho | B60J 5/0459 49/503 |
| 8,141,937 | B2 * | 3/2012 | Tsuyuzaki | B62D 25/16 296/187.12 |
| 8,931,826 | B2 | 1/2015 | Yoshimura et al. | |
| 8,960,768 | B2 * | 2/2015 | Kato | B62D 25/04 296/187.12 |
| 9,061,708 | B2 * | 6/2015 | Sugiyama | B62D 25/16 |
| 9,150,084 | B2 * | 10/2015 | Makowski | B60J 5/0456 |
| 10,035,543 | B2 * | 7/2018 | Sato | B62D 25/02 |
| 10,710,639 | B2 * | 7/2020 | Otoguro | B62D 25/04 |
| 11,052,734 | B2 * | 7/2021 | Horita | B60J 5/0455 |
| 11,279,411 | B2 * | 3/2022 | Yamazaki | B62D 25/02 |
| 11,912,338 | B2 * | 2/2024 | Tanabe | B62D 25/2036 |
| 2014/0062130 | A1 | 3/2014 | Yoshimura et al. | |
| 2014/0191535 | A1 | 7/2014 | Sugiyama et al. | |
| 2020/0130482 | A1 * | 4/2020 | Benson | B60J 5/0443 |
| 2020/0324629 | A1 | 10/2020 | Nakamura et al. | |

FOREIGN PATENT DOCUMENTS

| | | |
|---|---|---|
| JP | 2007145099 A | 6/2007 |
| JP | 2007331582 A | 12/2007 |
| JP | 2013119337 A | 6/2013 |
| JP | 2014051115 A | 3/2014 |
| JP | 2014131889 A | 7/2014 |
| KR | 20110085565 A | 7/2011 |

\* cited by examiner

*Primary Examiner* — Amy R Weisberg
*Assistant Examiner* — Veronica M Shull
(74) *Attorney, Agent, or Firm* — Lempia Summerfield Katz LLC

(57) ABSTRACT

A vehicle side structure including a rear impact beam mounted in a rear side door, a rear quarter section having a flange overlapping a rear portion of the rear impact beam, and a gusset aligned with the rear portion of the rear impact beam in an overlap area between the rear portion of the rear impact beam and the flange of the rear quarter section.

15 Claims, 13 Drawing Sheets

VEHICLE SIDE STRUCTURE

CROSS-REFERENCE TO RELATED APPLICATION

This application is based on and claims the benefit of priority to Korean Patent Application No. 10-2022-0081938, filed on Jul. 4, 2022, in the Korean Intellectual Property Office, the disclosure of which is incorporated herein in its entirety by reference.

TECHNICAL FIELD

The present disclosure relates to a vehicle side structure, and more particularly, to a vehicle side structure designed to prevent a vehicle door and an impact beam from intruding into a passenger compartment during a side-impact crash of the vehicle.

BACKGROUND

Various crash tests are conducted by the Insurance Institute for Highway Safety (IIHS) to measure vehicle stability. Currently, the IIHS is strengthening its conditions for crash tests. For example, new IIHS side-impact crash test conditions, which are scheduled to be introduced in 2023, include the weight of a moving deformable barrier (MDB) increasing from 1500 kg to 1900 kg and the evaluation speed increasing from 50 km/h to 60 km/h. The evaluation speed may increase impact energy of the MDB by approximately 82%. In order to reproduce the amount of vehicle door intrusion when an actual accident occurs, the strength of the MDB may change. Specifically, the strength of a central portion of the MDB may be lowered to approximately 55%, and the strength of a side portion of the MDB may be increased to approximately 354%. In addition, a criterion for a survival space of a vehicle body may greatly increase from 125 mm to 180 mm. Furthermore, injury criteria may change as follows. A chest displacement caused by the side-impact crash of the vehicle may decrease from 34 mm to 28 mm and a pelvic load caused by the side-impact crash of the vehicle may decrease from 5.1 kN to 4 kN. Accordingly, in the new, more stringent IIHS side-impact crash test, the amount of deformation of the existing vehicle side structure may relatively increase, and the injury criteria may be stricter. As the IIHS side-impact crash test conditions are strengthened, the vehicle side structure may be required to meet the new tougher IIHS side-impact crash test conditions and improve side impact performance (crashworthiness) to ensure the safety of occupants against side-impact crashes.

A vehicle may be provided with an impact beam in each vehicle door. Specifically, a front impact beam may be provided in a front side door of the vehicle and a rear impact beam may be provided in a rear side door of the vehicle. In the event of a side-impact crash of the vehicle, as the front impact beam and the rear impact beam are deformed, impact energy may be absorbed by the individually deformed beams.

In the existing vehicle side structure, a rear portion of the rear impact beam may only be supported by a flange of a quarter panel. In other words, there is no separate bracket or member for additionally supporting the rear portion of the rear impact beam. Accordingly, when the MDB hits the rear side door in the new, more stringent IIHS side-impact crash test, the rear portion of the rear impact beam may be separated from the flange of the quarter panel and intrude into a passenger compartment. Since the rear impact beam intrudes into the passenger compartment without being deformed during the side-impact crash, the rear impact beam may fail to absorb impact energy. Accordingly, the balance of impact energy absorption between the front impact beam and the rear impact beam may not be stably maintained during the side-impact crash. In other words, since the existing vehicle side structure fails to stably support the rear portion of the rear impact beam, it may fail to meet the new tougher IIHS side-impact crash test conditions and fail to achieve satisfactory side crashworthiness.

The above information described in this background section is provided to assist in understanding the background of the inventive concept. The above information thus may include any technical concept that is not considered as the prior art that is already known to those having ordinary skill in the art.

SUMMARY

The present disclosure has been made to solve the above-mentioned problems occurring in the prior art while advantages achieved by the prior art are maintained intact.

An aspect of the present disclosure provides a vehicle side structure designed to prevent a vehicle door and an impact beam from intruding into a passenger compartment during a side-impact crash of the vehicle.

According to an aspect of the present disclosure, a vehicle side structure may include: a rear impact beam mounted in a rear side door; a rear quarter section having a flange overlapping a rear portion of the rear impact beam; and a gusset at least partially overlapping the rear portion of the rear impact beam and the flange of the rear quarter section. As the gusset is aligned with the rear portion of the rear impact beam in an overlap area between the rear portion of the rear impact beam and the flange of the rear quarter section, the gusset may at least partially overlap the rear portion of the rear impact beam and the flange of the rear quarter section. Accordingly, the gusset may firmly support the rear portion of the rear impact beam in the event of a side-impact crash of the vehicle.

The rear quarter section may include a wheel house inner panel protruding toward a passenger compartment of the vehicle. The gusset may be configured to connect the flange of the rear quarter section and the wheel house inner panel. As the gusset is configured to connect the flange of the rear quarter section and the wheel house inner panel, the gusset may define a load path extending in a longitudinal direction of the vehicle between the flange of the rear quarter section and the wheel house inner panel. Accordingly, an impact load may be transferred through the load path.

The gusset may include a reinforcing wall extending obliquely from the flange of the rear quarter section toward the wheel house inner panel. As the reinforcing wall of the gusset extends obliquely, it may not interfere with the layout of other components (for example, a rear seat) located in the passenger compartment. Thus, there is no need to change the layout of other components.

The gusset may further include a front flange extending from the reinforcing wall toward the flange of the rear quarter section. The front flange may extend along a longitudinal direction of the flange of the rear quarter section and the front flange may be fixed to the flange of the rear quarter section. As the front flange extends along the longitudinal direction of the flange of the rear quarter section and is fixed to the flange of the rear quarter section, the front flange may define a load path extending in a vertical direction of the rear quarter section.

The gusset may further include a rear flange extending from the reinforcing wall toward the wheel house inner panel and the rear flange may be fixed to the wheel house inner panel. As the rear flange is fixed to the wheel house inner panel, the gusset may firmly connect the flange of the rear quarter section and the wheel house inner panel.

As the reinforcing wall is spaced apart from the flange of the rear quarter section, the gusset, the flange of the rear quarter section, and the wheel house inner panel may form a closed cross-section. As the gusset, the flange of the rear quarter section, and the wheel house inner panel form a closed cross-section, the gusset, the flange of the rear quarter section, and the wheel house inner panel may stably support the rear portion of the rear impact beam in the event of a side-impact crash of the vehicle.

The gusset may further include a recessed bead provided in the reinforcing wall and the recessed bead may be recessed from the reinforcing wall toward the rear quarter section. Accordingly, the stiffness of the reinforcing wall may be improved by the recessed bead.

The vehicle side structure may further include a reinforcing bracket extending from the gusset toward the rear of the vehicle and the reinforcing bracket may be mounted on the wheel house inner panel. As the reinforcing bracket extends from the gusset toward the rear of the vehicle, the gusset and the reinforcing bracket may define a load path extending in the longitudinal direction of the vehicle. Accordingly, the gusset and the reinforcing bracket may further improve the crashworthiness and stiffness of the rear quarter section.

The reinforcing bracket may include a reinforcing wall extending obliquely from a front portion of the wheel house inner panel toward a rear portion of the wheel house inner panel. As the reinforcing wall of the reinforcing bracket extends obliquely from the front portion of the wheel house inner panel toward the rear portion of the wheel house inner panel, it may not interfere with the layout of other components located in the passenger compartment. Thus there is no need to change the layout of other components.

The reinforcing bracket may further include a front flange extending from a front edge of the reinforcing wall toward the gusset, and the front flange may be fixed to the gusset. As the front flange is fixed to the gusset, the connection stiffness of the reinforcing bracket and the gusset may be improved.

The reinforcing bracket may further include a rear flange extending from a rear edge of the reinforcing wall toward the rear portion of the wheel house inner panel. The rear flange may be fixed to the rear portion of the wheel house inner panel. As the rear flange is fixed to the rear portion of the wheel house inner panel, the reinforcing bracket may increase the stiffness of the wheel house inner panel.

The vehicle side structure may further include a support structure supporting the wheel house inner panel. In addition, the rear flange of the reinforcing bracket may be connected to a lower portion of the support structure.

Specifically, the support structure may include a first support member supporting an upper portion of the wheel house inner panel and a second support member supporting a lower portion of the wheel house inner panel. The first support member and the second support member may extend in a height direction of the vehicle. As the support structure supports the wheel house inner panel in the height direction of the vehicle, the support stiffness of the wheel house inner panel may be improved.

A flange of the second support member may be fixed to the rear flange of the reinforcing bracket. As the second support member of the support structure is fixed to the rear flange of the reinforcing bracket, the reinforcing bracket may firmly connect the gusset and the support structure in the longitudinal direction of the vehicle.

The reinforcing bracket may further include a recessed bead provided in the reinforcing wall. The recessed bead may be recessed from the reinforcing wall toward the wheel house inner panel. Accordingly, the stiffness of the reinforcing bracket may be improved by the recessed bead.

The vehicle side structure may further include a rear side member connected to a lower portion of the rear quarter section. The gusset may be connected to the rear side member. As the gusset is connected to the rear side member, an impact load may be transferred from the rear portion of the rear impact beam to the rear side member through the gusset. Also, the rear side member and the gusset may stably bear the impact load.

The rear quarter section may further include a quarter inner panel forming a portion of the flange and the gusset may be configured to connect the quarter inner panel and the wheel house inner panel. As the gusset is configured to connect the quarter inner panel and the wheel house inner panel, the gusset may define a load path extending in the longitudinal direction of the vehicle between the quarter inner panel and the wheel house inner panel. Accordingly, the impact load may be transferred through the load path.

A rear portion of the rear impact beam may be mounted on a rear portion of the rear side door through a bracket. The bracket and the gusset may be aligned in a width direction of the vehicle. When the impact load is applied to the rear impact beam, the impact load may be transferred through the bracket, the gusset, and the reinforcing bracket. Thus, the crashworthiness of the vehicle may be improved.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
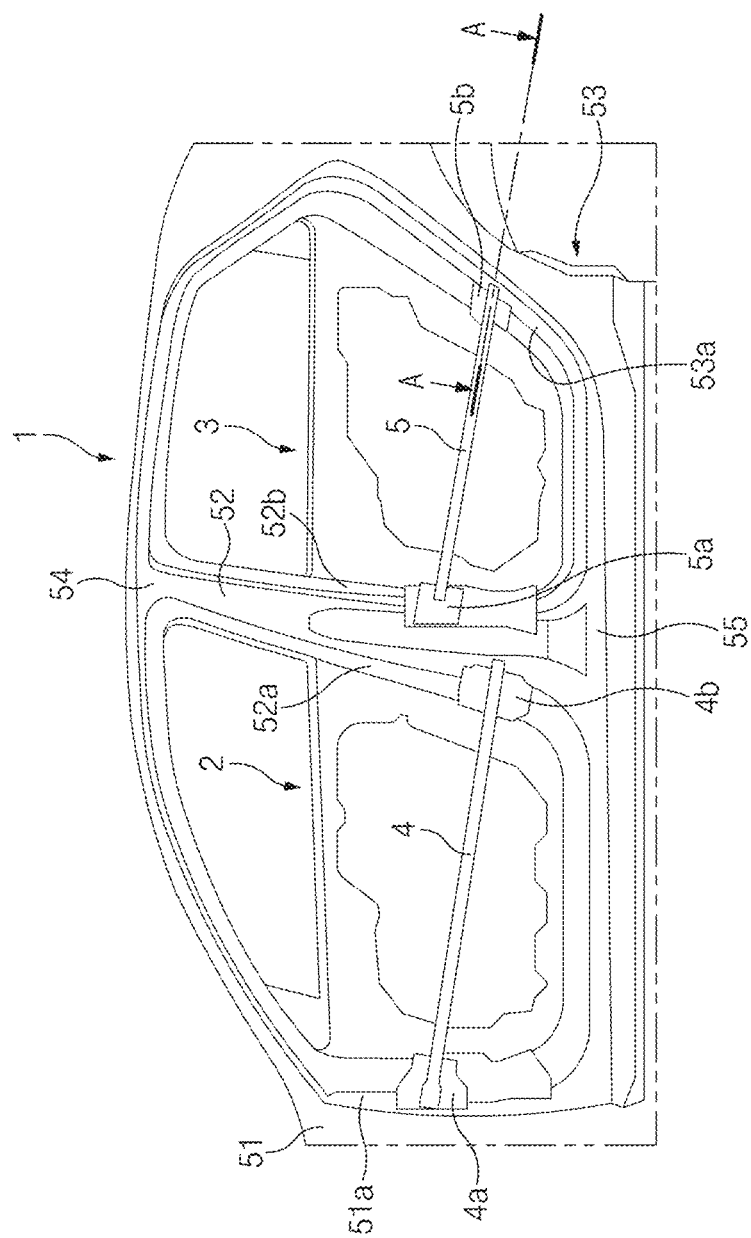
FIG. 1 illustrates a vehicle side structure according to an embodiment of the present disclosure.

Hereinafter, embodiments of the present disclosure are described in detail with reference to the accompanying drawings. In the drawings, the same reference numerals are used throughout to designate the same or equivalent elements. In addition, a detailed description of well-known techniques associated with the present disclosure have been ruled out in order not to unnecessarily obscure the gist of the present disclosure.

Terms such as first, second, A, B, (a), and (b) may be used to describe the elements in embodiments of the present disclosure. These terms are only used to distinguish one element from another element and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings consistent with the contextual meanings in the relevant field of art. Such terms are not to be interpreted as having ideal or excessively formal meanings unless clearly defined as having such in the present application.

Referring to FIGS. 1-4, a vehicle side structure 1 according to an embodiment of the present disclosure may include: an upper section 54; a lower section 55 located below the upper section 54; a front pillar 51 connecting a front end of the upper section 54 and a front end of the lower section 55; a center pillar 52 connecting a central portion of the upper section 54 and a central portion of the lower section 55; and a rear quarter section 53. The rear quarter section 53 connects a rear end of the upper section 54 and a rear end of the lower section 55.

The upper section 54 may be configured to connect an upper end portion of the front pillar 51, an upper end portion of the center pillar 52, and an upper end portion of the rear quarter section 53. The lower section 55 may be configured to connect a lower end portion of the front pillar 51, a lower end portion of the center pillar 52, and a lower end portion of the rear quarter section 53. The front pillar 51 may be located on the front of a passenger compartment, the center pillar 52 may be located in the middle of the passenger compartment, and the rear quarter section 53 may be located on the rear of the passenger compartment.

The vehicle side structure 1 according to an embodiment of the present disclosure may have a front opening defined by the front pillar 51, the center pillar 52, the upper section 54, and the lower section 55. A front side door 2 may be disposed between the front pillar 51 and the center pillar 52 to cover or uncover the front opening. A front impact beam 4 may be mounted in the front side door 2 and the front impact beam 4 may extend in a longitudinal direction of the vehicle. Referring to FIG. 1, the front impact beam 4 may be mounted on a front inner panel of the front side door 2. A front portion of the front impact beam 4 may be mounted on a front portion of the front side door 2 through a bracket 4a. A rear portion of the front impact beam 4 may be mounted on a rear portion of the front side door 2 through a bracket 4b. The front pillar 51 may have a flange 51a facing the front opening. The center pillar 52 may have a first flange 52a facing the front opening and a second flange 52b facing a rear opening. The rear quarter section 53 may have a flange 53a facing the rear opening. The front portion of the front impact beam 4 may overlap and be supported by the flange 51a of the front pillar 51. The rear portion of the front impact beam 4 may overlap and be supported by the first flange 52a of the center pillar 52.

The vehicle side structure 1 according to an embodiment of the present disclosure may have the rear opening defined by the center pillar 52, the rear quarter section 53, the upper section 54, and the lower section 55. A rear side door 3 may be disposed between the center pillar 52 and the rear quarter section 53 to cover or uncover the rear opening. A rear impact beam 5 may be mounted in the rear side door 3 and the rear impact beam 5 may extend in the longitudinal direction of the vehicle. Referring to FIG. 1, the rear impact beam 5 may be mounted on a rear inner panel of the rear side door 3. A front portion of the rear impact beam 5 may be mounted on a front portion of the rear side door 3 through a bracket 5a. A rear portion of the rear impact beam 5 may be mounted on a rear portion of the rear side door 3 through a bracket 5b. The front portion of the rear impact beam 5 may overlap and be supported by the second flange 52b of the center pillar 52. The rear portion of the rear impact beam 5 may overlap and be supported by the flange 53a of the rear quarter section 53.

Figure 2:
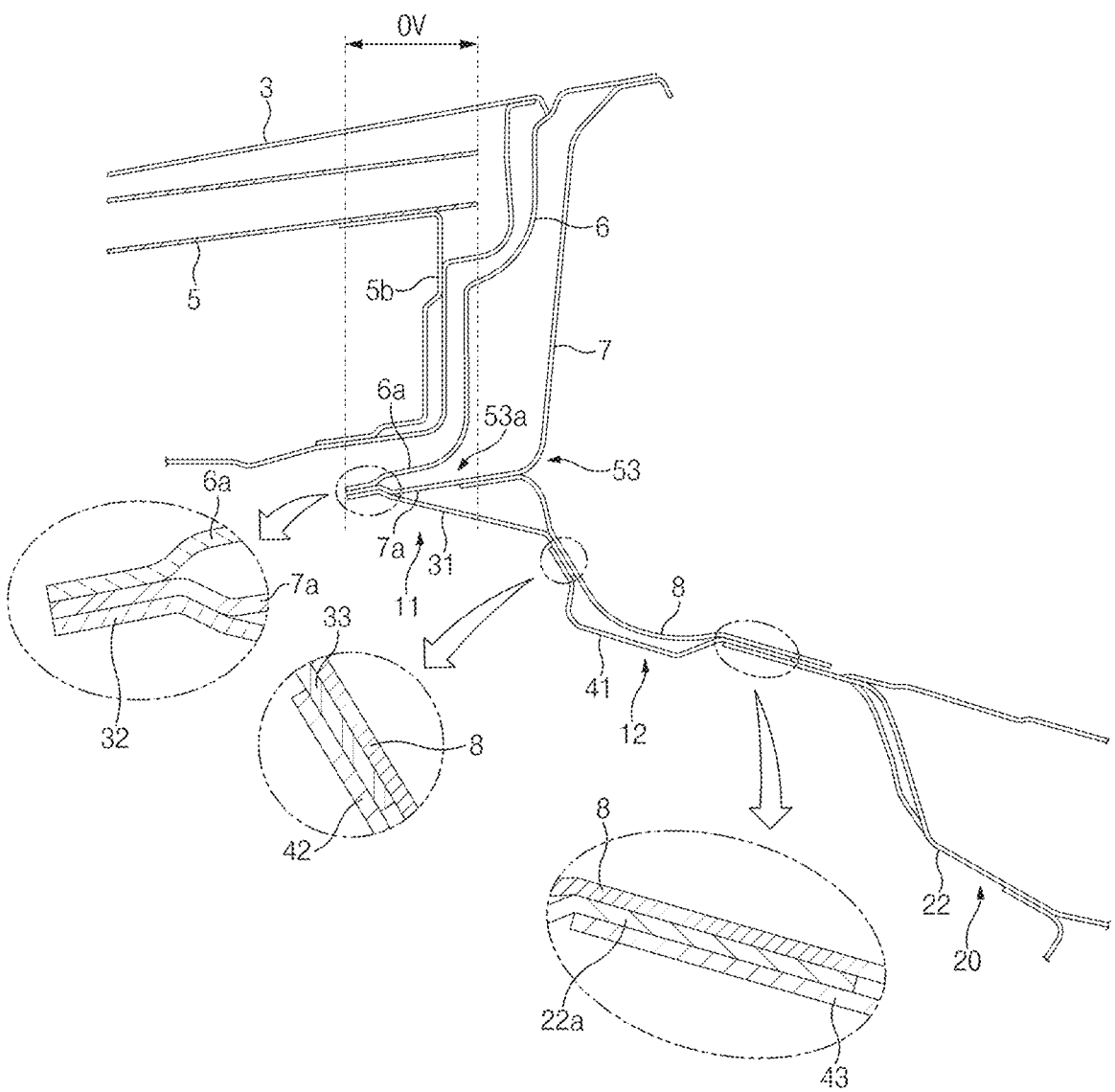
FIG. 2 illustrates a cross-sectional view, taken along line A-A of FIG. 1.

Referring to FIG. 2, the rear quarter section 53 may include a rear side outer panel 6 defining a rear edge of the rear opening, a wheel house outer panel 7 connected to the rear side outer panel 6, and a wheel house inner panel 8 connected to the wheel house outer panel 7.

The rear side outer panel 6 may define the rear edge of the rear opening and the rear side outer panel 6 may have a flange 6a extending toward the rear opening.

The wheel house outer panel 7 may face the exterior of the vehicle and the wheel house inner panel 8 may face the passenger compartment of the vehicle. The wheel house outer panel 7 and the wheel house inner panel 8 may form a rear wheel house to surround and protect a rear wheel.

A quarter inner panel 7a may extend from the wheel house outer panel 7 toward the rear opening and the quarter inner panel 7a may face the passenger compartment. The quarter inner panel 7a may form a portion of the flange 53a of the rear quarter section 53. According to an embodiment, the quarter inner panel 7a and the wheel house outer panel 7 may form a unitary one-piece structure. According to another embodiment, the quarter inner panel 7a may be made of a different component from the wheel house outer panel 7. Also, the quarter inner panel 7a may be fixed to the wheel house outer panel 7 using fasteners, welding, and/or the like.

Figure 3:
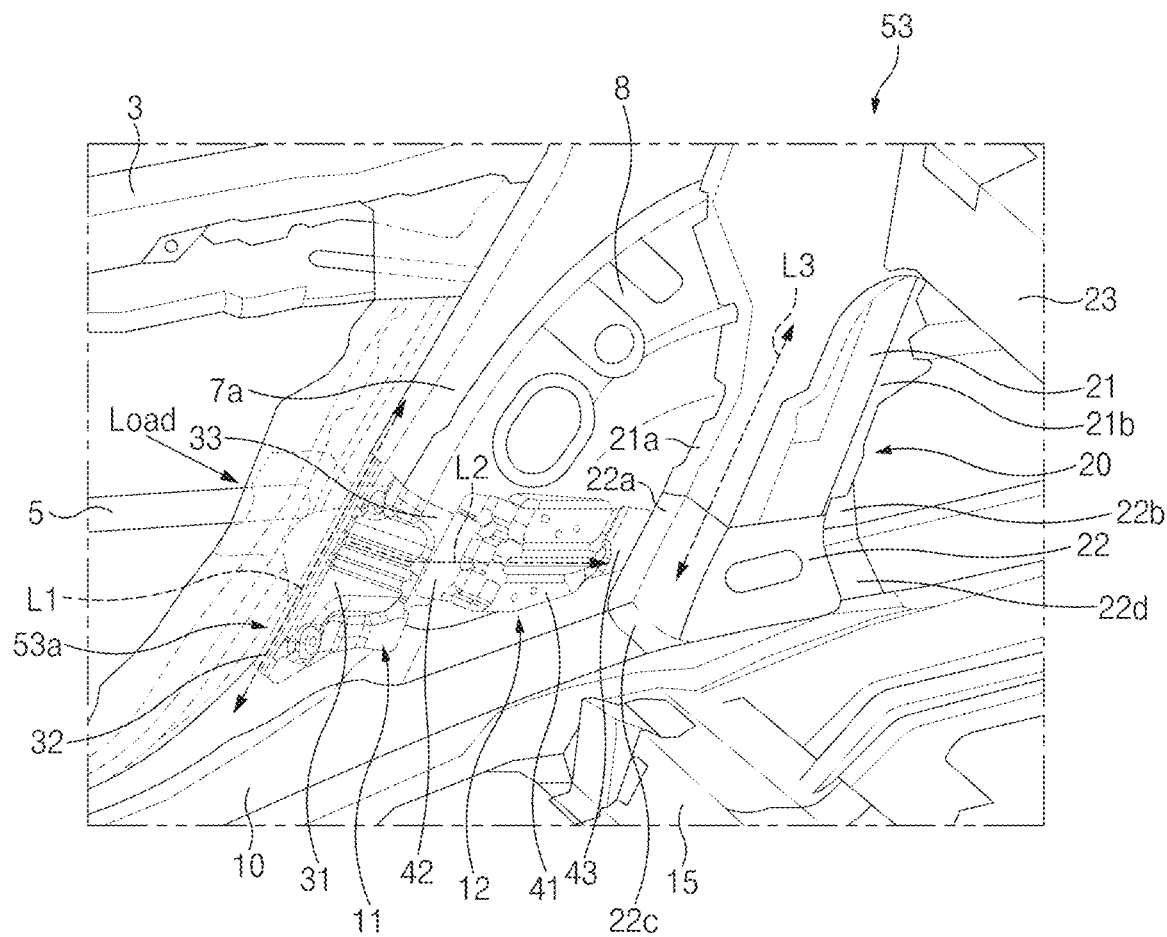
FIG. 3 illustrates a perspective view of a rear quarter section of a vehicle side structure according to an embodiment of the present disclosure, which is viewed from the interior of the vehicle.

Referring to FIGS. 2 and 3, a flange of the wheel house inner panel 8 may be fixed to the quarter inner panel 7a so that the wheel house inner panel 8 may be connected to the quarter inner panel 7a.

Referring to FIG. 3, a rear side member 10 may be connected to a lower portion of the rear quarter section 53 and the rear side member 10 may be aligned with the lower section 55. The rear side member 10 may extend in the longitudinal direction of the vehicle.

The pair of rear wheel houses may be located on the rear of the vehicle. Each rear wheel house may be supported by a support structure 20 located on the rear of the vehicle. Referring to FIG. 3, the support structure 20 may include a first support member 21 mounted on the wheel house inner panel 8 of the rear wheel house, a second support member 22 extending from a bottom end of the first support member 21 to the rear side member 10, and a horizontal member 23 extending in a width direction of the vehicle.

The first support member 21 may have a front flange 21a provided on a front edge thereof and a rear flange 21b provided on a rear edge thereof. The front flange 21a and the rear flange 21b of the first support member 21 may be fixed to an upper portion of the wheel house inner panel 8 using fasteners, welding, and/or the like. Accordingly, the first support member 21 may firmly support the upper portion of the wheel house inner panel 8.

The second support member 22 may have a front flange 22a provided on a front edge thereof, a rear flange 22b provided on a rear edge thereof, a front lower flange 22c provided on a front bottom end thereof, and a rear lower flange 22d provided on a rear bottom end thereof. The front flange 22a and the rear flange 22b of the second support member 22 may be fixed to a lower portion of the wheel house inner panel 8 using fasteners, welding, and/or the like. Accordingly, the second support member 22 may firmly support the lower portion of the wheel house inner panel 8. The front lower flange 22c and the rear lower flange 22d of the second support member 22 may be fixed to the rear side member 10 using fasteners, welding, and/or the like. Accordingly, the second support member 22 may firmly connect the first support member 21 and the rear side member 10.

The first support member 21 and the second support member 22 may extend in a height direction of the vehicle. The second support member 22 may be connected to the rear side member 10 so that the first support member 21 and the second support member 22 may define a load path L3 (see FIG. 3) extending in the height direction of the vehicle.

The flange 6a of the rear side outer panel 6 may be fixed to the quarter inner panel 7a using fasteners, welding, and/or the like so that the flange 6a of the rear side outer panel 6 and the quarter inner panel 7a may form the flange 53a of the rear quarter section 53. The rear portion of the rear impact beam 5 may be mounted on the rear portion of the rear side door 3 through the bracket 5b, and the rear portion of the rear side door 3 may partially overlap the flange 6a of the rear side outer panel 6. The rear portion of the rear impact beam 5 and the flange 53a of the rear quarter section 53 may have a predetermined overlap area OV. In the event of a side-impact crash of the vehicle, when impact energy is transferred to the rear impact beam 5, the rear portion of the rear impact beam 5 may be supported by the flange 53a of the rear quarter section 53.

According to an embodiment, the front pillar 51 and the center pillar 52 may be made of a high-strength material such as high-strength steel by a hot stamping method. The rear quarter section 53 may be made of a relatively low-strength material compared to the material of the front pillar 51 and the center pillar 52, considering cost reduction and ease of manufacture.

In a new, more stringent side-impact crash test conducted by the Insurance Institute for Highway Safety (IIHS), when a moving deformable barrier (MDB) hits the front side door 2, the front portion of the front impact beam 4 may be supported by the flange 51a of the front pillar 51, which is made of a high-strength material. Also, the rear portion of the front impact beam 4 may be supported by the first flange 52a of the center pillar 52, which is also made of a high-strength material. Accordingly, when the MDB hits the front impact beam 4, a central portion of the front impact beam 4 may be deformed and sufficiently absorb impact energy. The front portion of the rear impact beam 5 may be supported by the second flange 52b of the center pillar 52, which is made of a high-strength material and the rear portion of the rear impact beam 5 may be supported by the flange 53a of the rear quarter section 53, which is made of a low-strength material. Accordingly, when the MDB hits the rear impact beam 5, the rear portion of the rear impact beam 5 and the bracket 5b may be separated from the flange 53a of the rear quarter section 53 so that it may be likely to intrude into the passenger compartment. In other words, since the rear quarter section 53 is made of the relatively low-strength material, the rear portion of the rear impact beam 5 may not be sufficiently supported by the flange 53a of the rear quarter section 53. Accordingly, in the event of a side-impact crash of the vehicle, the rear impact beam 5 may fail to absorb the impact energy through its deformation. Thus, it may not be able to perform the function of the rear impact beam 5.

To deal with this, the vehicle side structure 1 according to an embodiment of the present disclosure may include a gusset 11 at least partially overlapping the rear portion of the rear impact beam 5, the bracket 5b, and the flange 53a of the rear quarter section 53. Referring to FIG. 2, in the overlap area OV between the rear portion of the rear impact beam 5 and the flange 53a of the rear quarter section 53, the gusset 11 may be aligned with the rear portion of the rear impact beam 5 and the bracket 5b in the width direction of the vehicle. The gusset 11 may extend from the flange 53a of the rear quarter section 53 toward the rear of the vehicle. In particular, the gusset 11 may at least partially overlap the rear portion of the rear impact beam 5, the bracket 5b, and the flange 53a of the rear quarter section 53. Accordingly, in the event of a side-impact crash of the vehicle, the gusset 11 may firmly support the rear portion of the rear impact beam 5. The gusset 11 may extend from the flange 53a of the rear quarter section 53 toward the rear of the vehicle.

Specifically, the gusset 11 may be fixed to the quarter inner panel 7a using fasteners, welding, and/or the like so that at least a portion of the gusset 11 may overlap the flange 53a of the rear quarter section 53 and the rear portion of the rear impact beam 5.

Referring to FIG. 2, the gusset 11 may include a reinforcing wall 31, a front flange 32 extending from the reinforcing wall 31 toward the flange 53a of the rear quarter section 53, and a rear flange 33 extending from the reinforcing wall 31 toward the wheel house inner panel 8.

The gusset 11 may be configured to connect the flange 53a of the rear quarter section 53 and the wheel house inner panel 8. Accordingly, the gusset 11 may define a load path extending in the longitudinal direction of the vehicle between the flange 53a of the rear quarter section 53 and the wheel house inner panel 8. Thus, an impact load may be transferred through the load path. Specifically, the gusset 11 may be configured to directly connect the quarter inner panel 7a and the wheel house inner panel 8.

The reinforcing wall 31 may extend from the flange 53a of the rear quarter section 53 toward the wheel house inner panel 8. The wheel house inner panel 8 may protrude from the quarter inner panel 7a of the rear quarter section 53 toward the passenger compartment of the vehicle. Accordingly, the reinforcing wall 31 may be inclined from the flange 53a of the rear quarter section 53 toward the wheel house inner panel 8. As the reinforcing wall 31 of the gusset 11 extends obliquely, it may not interfere with the layout of other components (for example, a rear seat) located in the passenger compartment. Thus there is no need to change the layout of other components.

The front flange 32 may extend from a front edge of the reinforcing wall 31 toward the flange 53a of the rear quarter section 53. The front flange 32 may be fixed to the flange 53a of the rear quarter section 53 using fasteners, welding, and/or the like. Specifically, the front flange 32 may be fixed to the quarter inner panel 7a using fasteners, welding, and/or the like.

Referring to FIG. 3, the front flange 32 may extend along a longitudinal direction (for example, vertical direction) of the flange 53a of the rear quarter section 53. In particular, the front flange 32 may be fixed to the quarter inner panel 7a of the rear quarter section 53 using fasteners, welding, and/or the like so that the front flange 32 of the gusset 11 may define a load path L1 (see FIG. 3) extending in the longitudinal direction (for example, vertical direction) of the rear quarter section 53.

The rear flange 33 may extend from a rear edge of the reinforcing wall 31 toward the wheel house inner panel 8. The rear flange 33 of the gusset 11 may be fixed to a front portion of the wheel house inner panel 8 using fasteners, welding, and/or the like. The rear flange 33 may extend along the longitudinal direction of the vehicle.

Referring to FIG. 2, the reinforcing wall 31 may be spaced apart from the flange 53a of the rear quarter section 53. The gusset 11, the flange 53a of the rear quarter section 53, and the wheel house inner panel 8 may define a cavity therebetween. Accordingly, the gusset 11, the flange 53a of the rear quarter section 53, and the wheel house inner panel 8 may form a closed cross-section. In the event of a side-impact crash of the vehicle, the gusset 11, the flange 53a of the rear quarter section 53, and the wheel house inner panel 8 may stably support the rear portion of the rear impact beam 5. Specifically, the reinforcing wall 31 may be spaced apart from the quarter inner panel 7a so that the gusset 11, the quarter inner panel 7a, and the wheel house inner panel 8 may define a cavity therebetween. Accordingly, the gusset 11, the quarter inner panel 7a, and the wheel house inner panel 8 may form a closed cross-section.

Figure 4:
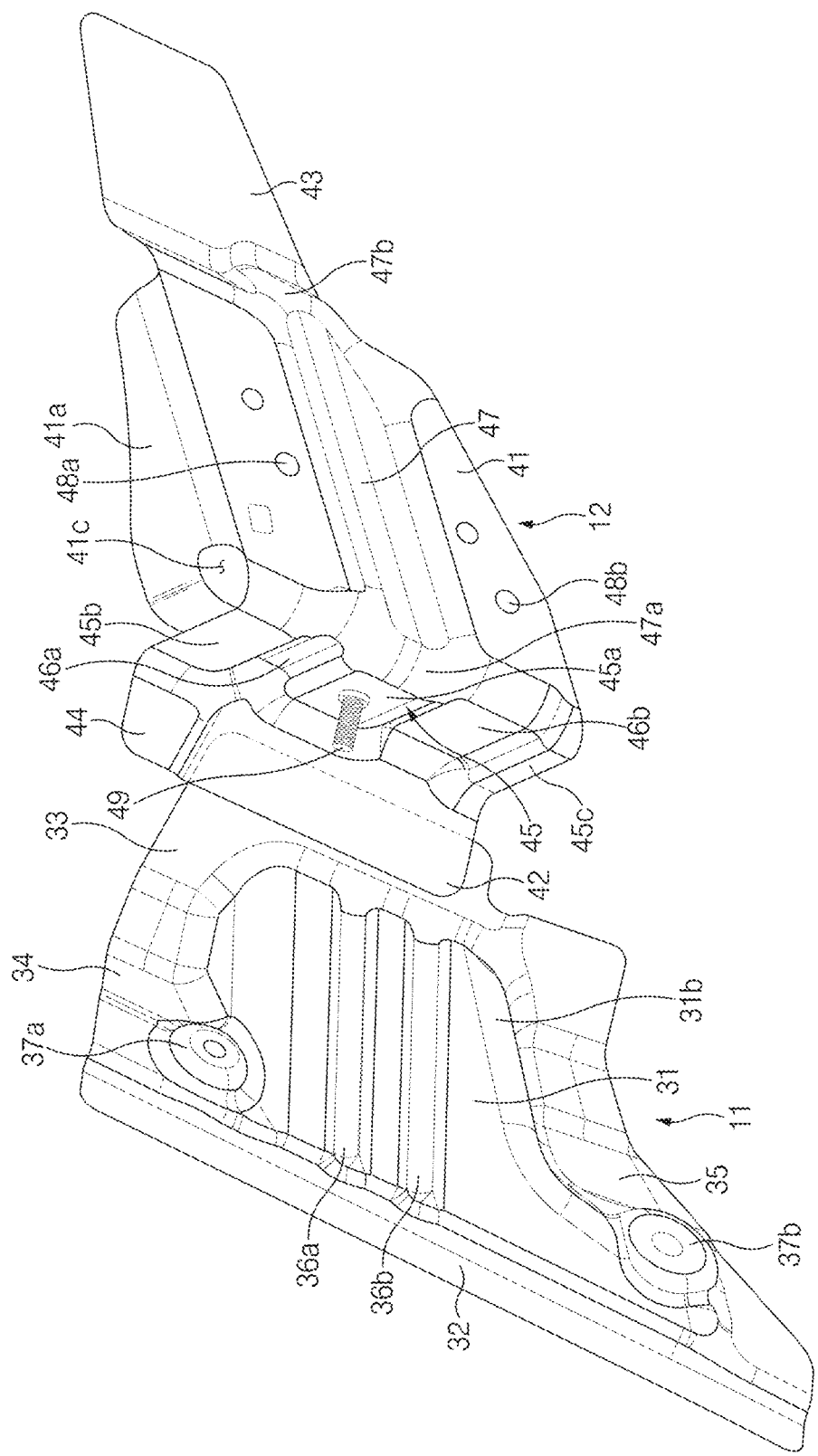
FIG. 4 illustrates a perspective view of a gusset and a reinforcing bracket used in a rear quarter section of a vehicle side structure according to an embodiment of the present disclosure.
Figure 10:
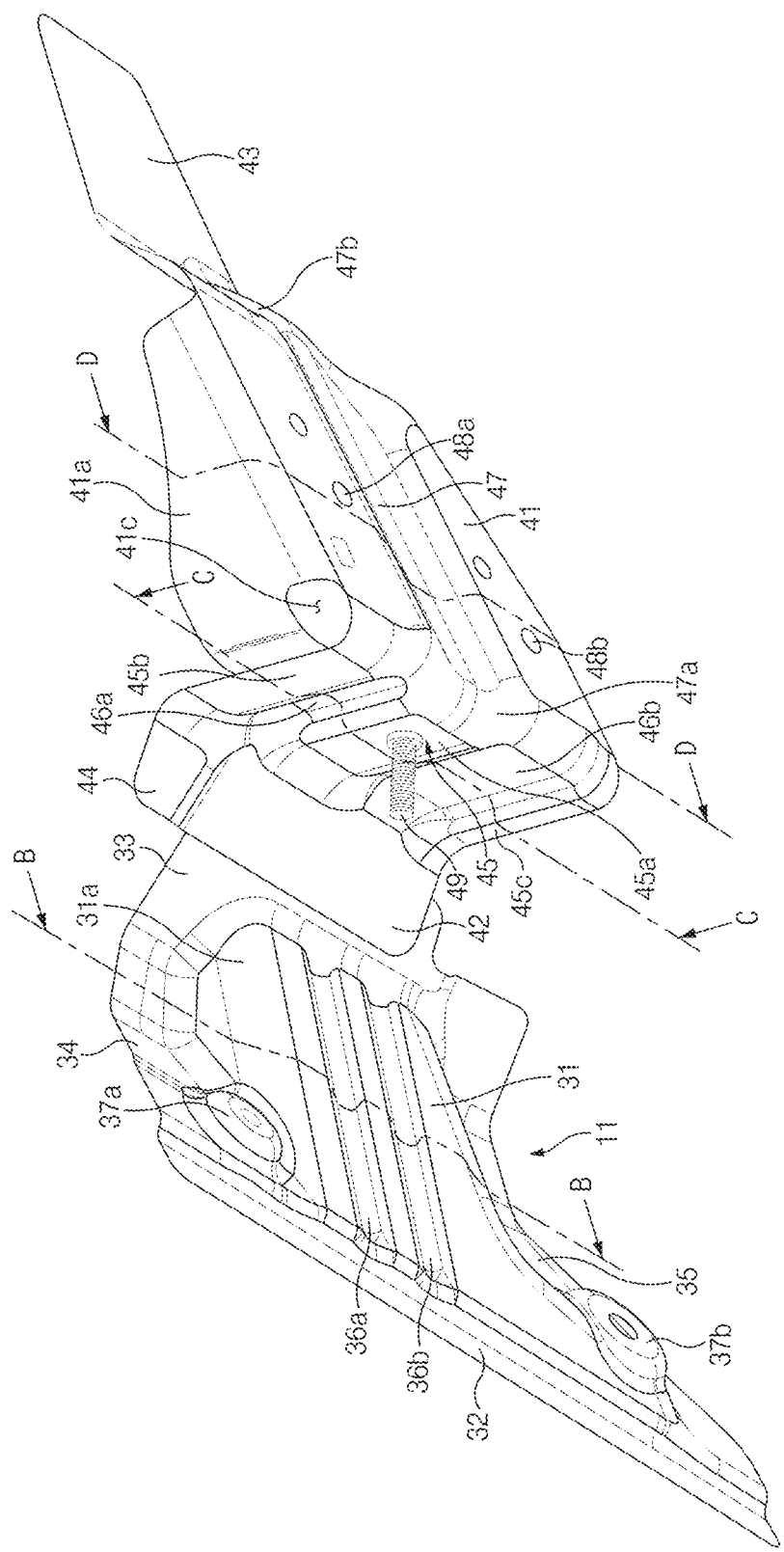
FIG. 10 illustrates a perspective view of the gusset and the reinforcing bracket illustrated in FIG. 4, which is viewed in a different direction.
Figure 11:
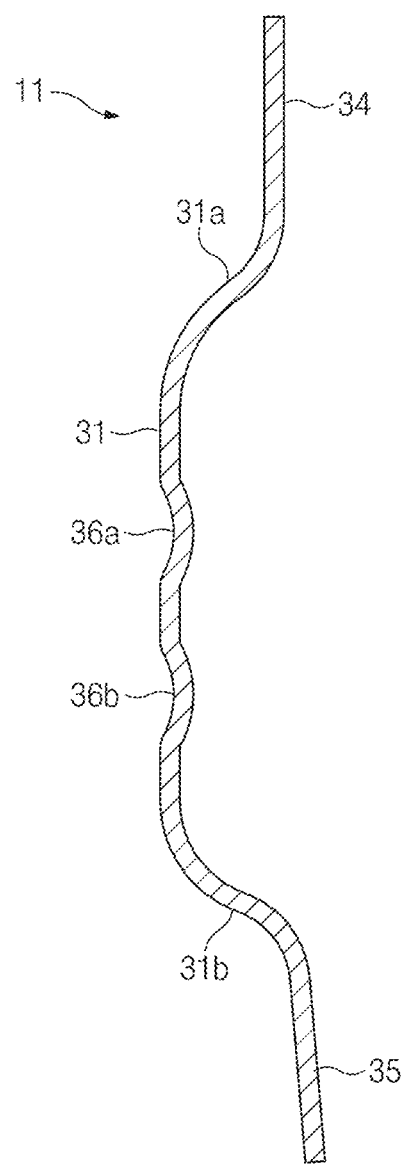
FIG. 11 illustrates a cross-sectional view, taken along line B-B of FIG. 10.

Referring to FIGS. 4, 10, and 11, the gusset 11 may have recessed beads 36a and 36b provided in the reinforcing wall 31. The recessed beads 36a and 36b may be recessed from the reinforcing wall 31 toward the quarter inner panel 7a of the rear quarter section 53. The two recessed beads 36a and 36b may be spaced apart from each other, and each of the recessed beads 36a and 36b may extend along a longitudinal direction of the reinforcing wall 31. The longitudinal stiffness of the reinforcing wall 31 may be increased by the recessed beads 36a and 36b.

Referring to FIGS. 4, 10, and 11, the gusset 11 may further include an upper flange 34 extending from the reinforcing wall 31 toward the top of the vehicle and a lower flange 35 extending from the reinforcing wall 31 toward the bottom of the vehicle. The upper flange 34 may be fixed to the quarter inner panel 7a of the rear quarter section 53 and the wheel house inner panel 8 using fasteners, welding, and/or the like. The lower flange 35 may be fixed to the quarter inner panel 7a of the rear quarter section 53 and the wheel house inner panel 8 using fasteners, welding, and/or the like.

Referring to FIG. 4, the gusset 11 may further include an upper mounting boss 37a raised from the upper flange 34 and a lower mounting boss 37b raised from the lower flange 35. The upper mounting boss 37a may be adjacent to the front flange 32 and the reinforcing wall 31 and the upper mounting boss 37a may have a hole into which a fastener is mounted. The lower mounting boss 37b may be adjacent to the front flange 32 and the reinforcing wall 31 and the lower mounting boss 37b may have a hole into which a fastener is mounted. The gusset 11 may be firmly mounted on the quarter inner panel 7a of the rear quarter section 53 through the upper mounting boss 37a and the lower mounting boss 37b.

Referring to FIG. 2, the vehicle side structure 1 according to an embodiment of the present disclosure may further include a reinforcing bracket 12 extending from the gusset 11 toward the rear of the vehicle. The reinforcing bracket 12 may be mounted on the wheel house inner panel 8 and the reinforcing bracket 12 may extend along the longitudinal direction of the vehicle. In addition, the reinforcing bracket 12 may be configured to connect the gusset 11 and the second support member 22 of the support structure 20 in the longitudinal direction of the vehicle. Accordingly, the gusset 11 and the reinforcing bracket 12 may define a load path L2 (see FIG. 3) extending in the longitudinal direction of the vehicle. Thus, the crashworthiness and stiffness of the rear quarter section 53 may be further improved.

The reinforcing bracket 12 may include: a reinforcing wall 41 extending from the front portion of the wheel house inner panel 8 toward a rear portion of the wheel house inner panel 8; a front flange 42 extending from a front edge of the reinforcing wall 41 toward the gusset 11; and a rear flange 43 extending from a rear edge of the reinforcing wall 41 toward the rear portion of the wheel house inner panel 8.

The reinforcing wall 41 may extend to match an exterior shape of a portion of the wheel house inner panel 8 between the front portion of the wheel house inner panel 8 and the rear portion of the wheel house inner panel 8. For example, the exterior shape between the front portion of the wheel house inner panel 8 and the rear portion of the wheel house inner panel 8 may be a curved shape. In particular, the reinforcing wall 41 may extend obliquely from the front portion of the wheel house inner panel 8 toward the rear portion of the wheel house inner panel 8. Further, the reinforcing wall 41 may cover a curved portion between the front portion of the wheel house inner panel 8 and the rear portion of the wheel house inner panel 8. As the reinforcing wall 41 of the reinforcing bracket 12 extends obliquely, it may not interfere with the layout of other components (for example, a rear seat) located in the passenger compartment. Thus, there is no need to change the layout of other components.

Referring to FIG. 2, the reinforcing wall 41 may be spaced apart from the wheel house inner panel 8 so that the reinforcing bracket 12 and the wheel house inner panel 8 may define a cavity therebetween. Accordingly, the reinforcing bracket 12 and the wheel house inner panel 8 may form a closed cross-section so that the stiffness of the wheel house inner panel 8 may be improved.

Referring to FIGS. 2-4, the front flange 42 of the reinforcing bracket 12 may at least partially overlap the rear flange 33 of the gusset 11. Further, the front flange 42 of the reinforcing bracket 12 may be fixed to the rear flange 33 of the gusset 11 using fasteners, welding, and/or the like.

Referring to FIGS. 4 and 10, the reinforcing bracket 12 may further include a recessed flange 44 located above the front flange 42. The recessed flange 44 may be recessed from the front flange 42 toward the wheel house inner panel 8 And the recessed flange 44 may directly contact the wheel house inner panel 8. In addition, the recessed flange 44 may be directly fixed to the wheel house inner panel 8 using fasteners, welding, and/or the like. Accordingly, the reinforcing bracket 12 may be firmly mounted on the wheel house inner panel 8.

Figure 7:
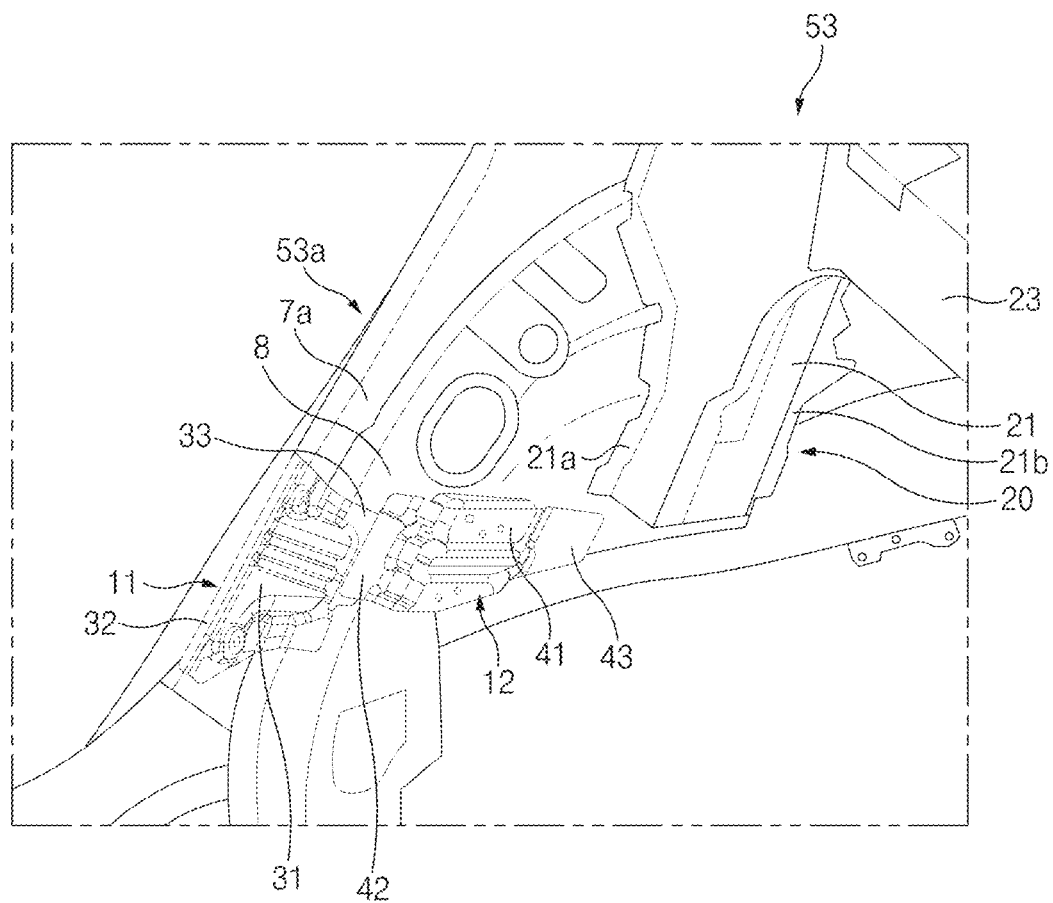
FIG. 7 illustrates a state in which the reinforcing bracket illustrated in FIG. 4 is mounted on the rear quarter section of the vehicle side structure.

Referring to FIG. 7, the rear flange 43 of the reinforcing bracket 12 may be fixed to the rear portion of the wheel house inner panel 8 using fasteners, welding, and/or the like. The rear flange 43 of the reinforcing bracket 12 may be connected to a lower portion of the support structure 20. Referring to FIGS. 2 and 3, the rear flange 43 of the reinforcing bracket 12 may at least partially overlap the front flange 22*a* of the second support member 22 of the support structure 20. The front flange 22*a* of the second support member 22 may be fixed to the rear flange 43 of the reinforcing bracket 12 using fasteners, welding, and/or the like.

Figure 13:
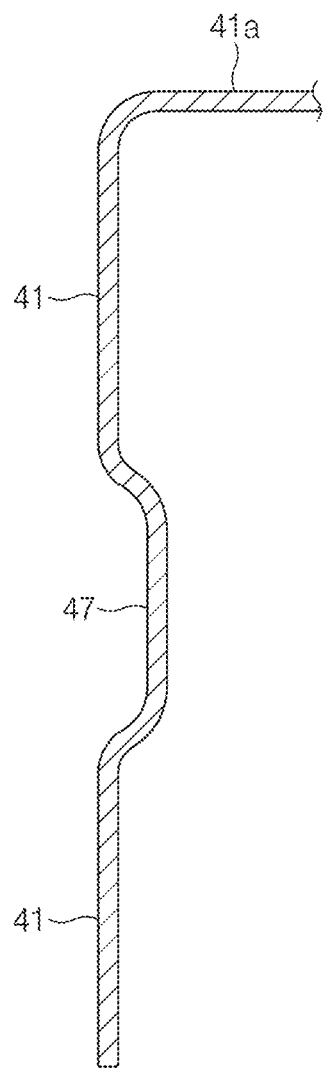
FIG. 13 illustrates a cross-sectional view, taken along line D-D of FIG. 10.

Referring to FIGS. 4, 10, and 13, the reinforcing bracket 12 may include a recessed bead 47 provided in the reinforcing wall 41. The recessed bead 47 may be recessed from the reinforcing wall 41 toward the wheel house inner panel 8. The recessed bead 47 may extend along a longitudinal central axis of the reinforcing wall 41 and the recessed bead 47 may extend along a longitudinal direction of the reinforcing wall 41. The stiffness of the reinforcing wall 41 may be increased by the recessed bead 47. The recessed bead 47 of the reinforcing bracket 12 may be aligned with the recessed beads 36*a* and 36*b* of the gusset 11 along the longitudinal direction of the vehicle. Thus, the longitudinal stiffness of the gusset 11 and the reinforcing bracket 12 may be further improved.

Referring to FIG. 4, the reinforcing bracket 12 may further include a front wall 45 located between the reinforcing wall 41 and the front flange 42. The front wall 45 may be angularly connected to the front flange 42 and the reinforcing wall 41 may be angularly connected to the front wall 45. The front flange 42 may extend from the front wall 45 toward the gusset 11. The front wall 45 may include a center raised bead 45*a* aligned with the recessed bead 47 along a longitudinal direction of the reinforcing bracket 12. The center raised bead 45*a* may extend along a longitudinal direction of the front wall 45 and the stiffness of the front wall 45 may be increased by the center raised bead 45*a*.

Figure 12:
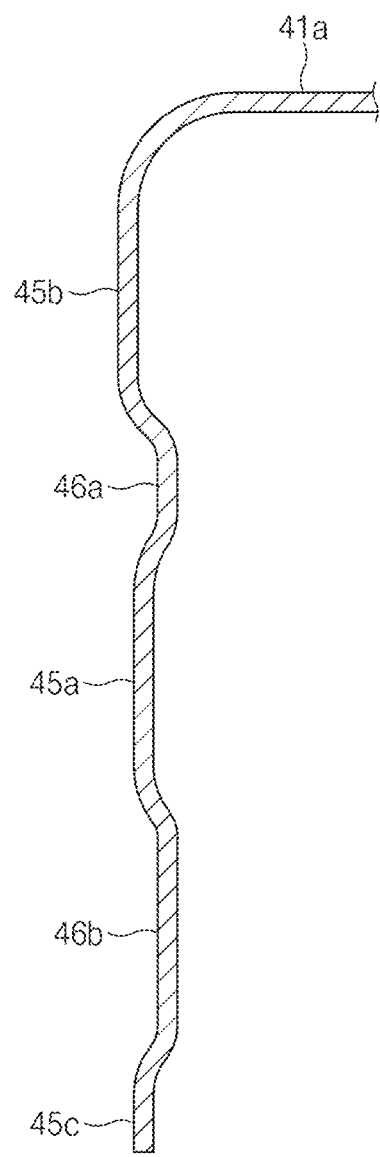
FIG. 12 illustrates a cross-sectional view, taken along line C-C of FIG. 10.

Referring to FIGS. 4, 10, and 12, the front wall 45 may include: an upper recessed bead 46*a* located above the center raised bead 45*a*; a lower recessed bead 46*b* located below the center raised bead 45*a*; an upper raised bead 45*b* located above the upper recessed bead 46*a*; and a lower raised bead 45*c* located below the lower recessed bead 46*b*. The upper recessed bead 46*a*, the lower recessed bead 46*b*, the upper raised bead 45*b*, and the lower raised bead 45*c* may be parallel to the center raised bead 45*a*. The stiffness of the front wall 45 may be increased by the upper recessed bead 46*a*, the lower recessed bead 46*b*, the center raised bead 45*a*, the upper raised bead 45*b*, and the lower raised bead 45*c*.

Referring to FIG. 4, the upper recessed bead 46*a*, the upper raised bead 45*b*, the lower recessed bead 46*b*, and the lower raised bead 45*c* may be connected to the reinforcing wall 41.

Referring to FIG. 4, the recessed bead 47 may be connected to the center raised bead 45*a* through a front curved portion 47*a* which is curved at a predetermined radius. The recessed bead 47 may be connected to the rear flange 43 through a rear protrusion 47*b*.

Referring to FIG. 4, the reinforcing bracket 12 may further include a top wall 41*a* connected to the reinforcing wall 41 and the upper raised bead 45*b* of the front wall 45. The top wall 41*a* may connect the reinforcing wall 41 and the front wall 45 so that the overall stiffness of the reinforcing bracket 12 may be improved. An opening 41*c* may be formed in a corner portion between the top wall 41*a*, the upper raised bead 45*b* of the front wall 45, and an upper portion of the reinforcing wall 41. The weight of the reinforcing bracket 12 may be reduced through the opening 41*c*.

FIGS. 5-8 illustrate a process of assembling the gusset 11 and the reinforcing bracket 12 to the rear quarter section 53.

Figure 5:
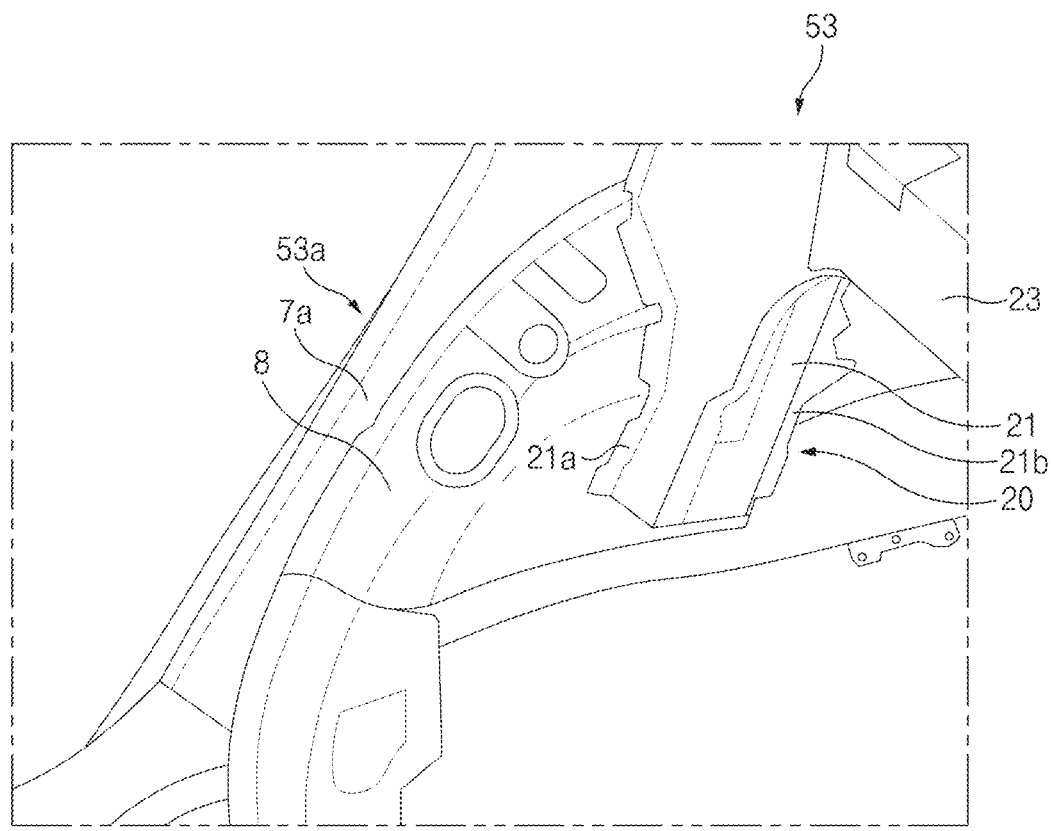
FIG. 5 illustrates a state in which a first support member and a horizontal member of a support structure are connected to a wheel house inner panel.

Referring to FIG. 5, the first support member 21 and the horizontal member 23 of the support structure 20 may be assembled to the vehicle body so as to support the wheel house inner panel 8 of the rear quarter section 53. The front flange 21*a* and the rear flange 21*b* of the first support member 21 may be fixed to the upper portion of the wheel house inner panel 8 using fasteners, welding, and/or the like. Accordingly, the first support member 21 may firmly support the upper portion of the wheel house inner panel 8.

Figure 6:
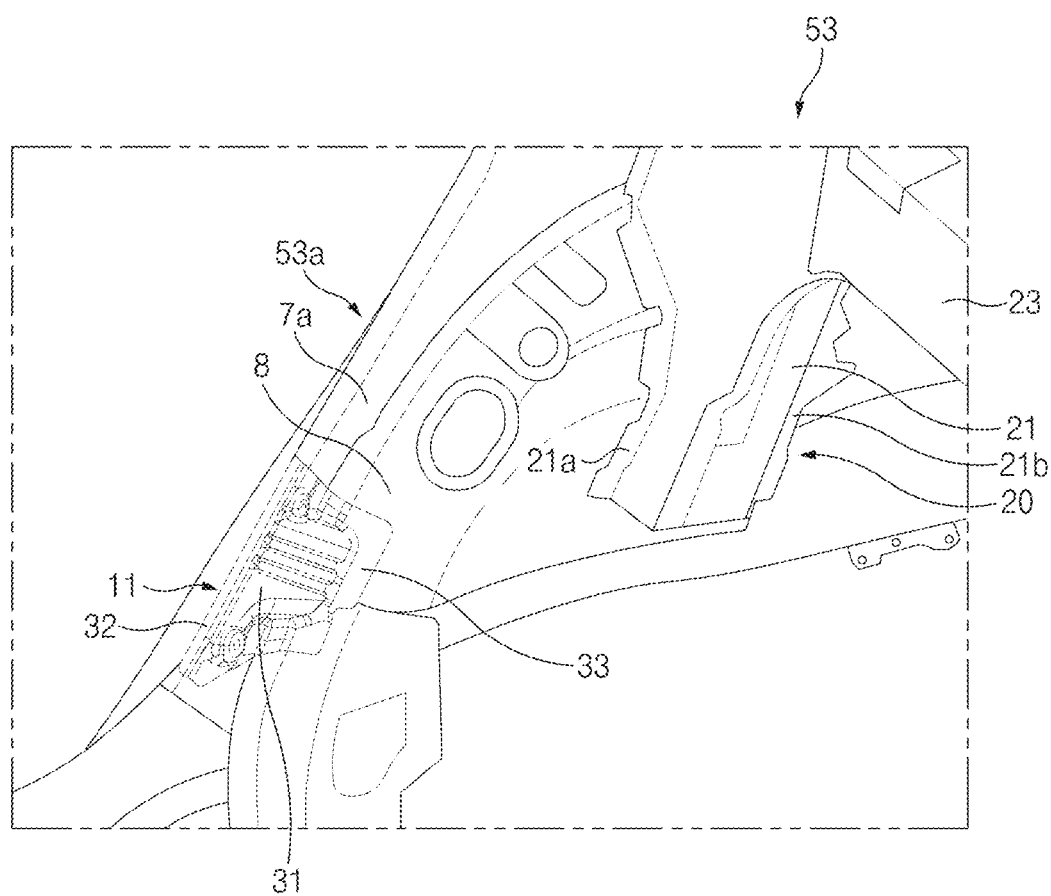
FIG. 6 illustrates a state in which the gusset illustrated in FIG. 4 is mounted on the rear quarter section of the vehicle side structure.

After the first support member 21 and the horizontal member 23 of the support structure 20 are mounted, as illustrated in FIG. 6, the front flange 32 of the gusset 11 may be fixed to the quarter inner panel 7*a* of the rear quarter section 53. The rear flange 33 of the gusset 11 may be fixed to the wheel house inner panel 8.

After the gusset 11 is mounted, as illustrated in FIG. 7, a front portion of the reinforcing bracket 12 may be fixed to the rear flange 33 of the gusset 11. Also, a rear portion of the reinforcing bracket 12 may be fixed to the wheel house inner panel 8 of the rear quarter section 53.

Figure 8:
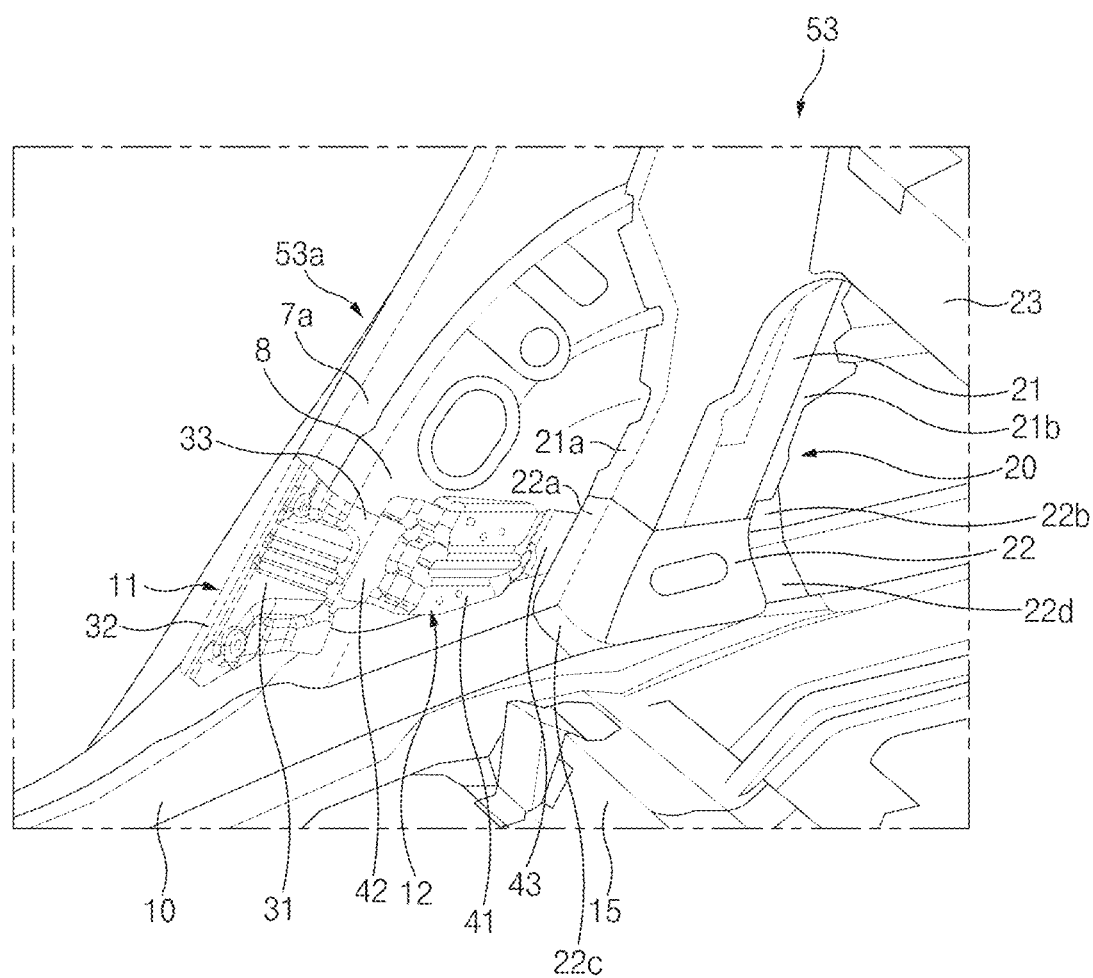
FIG. 8 illustrates a state in which a second support member of the support structure is mounted on the rear quarter section of the vehicle side structure.

After the reinforcing bracket 12 is mounted, as illustrated in FIG. 8, the second support member 22 may be connected to the first support member 21. The front flange 22*a* and the rear flange 22*b* of the second support member 22 may be fixed to the wheel house inner panel 8. Also, the front lower flange 22*c* and the rear lower flange 22*d* of the second support member 22 may be fixed to the rear side member 10.

Referring to FIGS. 2 and 3, at least a portion of the gusset 11 may partially overlap the rear portion of the rear impact beam 5 in the overlap area OV between the rear portion of the rear impact beam 5 and the flange 53*a* of the rear quarter section 53. In the event of a side-impact crash of the vehicle, when the rear impact beam 5 hits the flange 53*a* of the rear quarter section 53, the gusset 11 may prevent the rear portion of the rear impact beam 5 and the flange 53*a* of the rear quarter section 53 from intruding into the passenger compartment. The rear impact beam 5 may be appropriately deformed by an impact load, thereby absorbing impact energy.

Referring to FIGS. 2 and 3, the front flange 32 of the gusset 11 may overlap and be fixed to the quarter inner panel 7*a* of the rear quarter section 53. The rear flange 33 of the gusset 11 may be fixed to the wheel house inner panel 8 of the rear quarter section 53. In addition, the front flange 42 of the reinforcing bracket 12 may overlap and be fixed to the rear flange 33 of the gusset 11. The front flange 22*a* of the second support member 22 of the support structure 20 may overlap and be fixed to the rear flange 43 of the reinforcing bracket 12. In the event of a side-impact crash of the vehicle, the impact load may be transferred from the gusset 11 through the rear side door 3 and the rear impact beam 5. Also, the impact load may be transferred through the load path L1 defined by the front flange 32 of the gusset 11 in the height direction of the vehicle. In addition, the impact load may be transferred through the load path L2 defined by the gusset 11 and the reinforcing bracket 12. The load path L3 defined by the first support member 21 and the second support member 22 in the height direction of the vehicle. Accordingly, the impact load applied to the rear side door 3 and the rear impact beam 5 may be uniformly distributed through the gusset 11, the reinforcing bracket 12, and the support structure 20, and the rear impact beam 5 may absorb the impact energy.

The gusset 11 may be directly or indirectly connected to the rear side member 10. As the gusset 11 is connected to the rear side member 10, the support stiffness of the gusset 11 may be further improved.

According to an embodiment, the gusset 11 may be directly connected to the rear side member 10. For example, the gusset 11 may be integrally connected to an upper flange of the rear side member 10 so that the gusset 11 may be directly connected to the rear side member 10. In particular, the gusset 11 and the rear side member 10 may form a unitary one-piece structure by various manufacturing methods such as pressing and casting. For example, when the rear portion of the rear impact beam 5 is located relatively low (i.e., the rear portion of the rear impact beam 5 is close to the lower section 55), the gusset 11 may be directly connected to the rear side member 10 so that the gusset 11 may overlap the rear portion of the rear impact beam 5.

Figure 9:
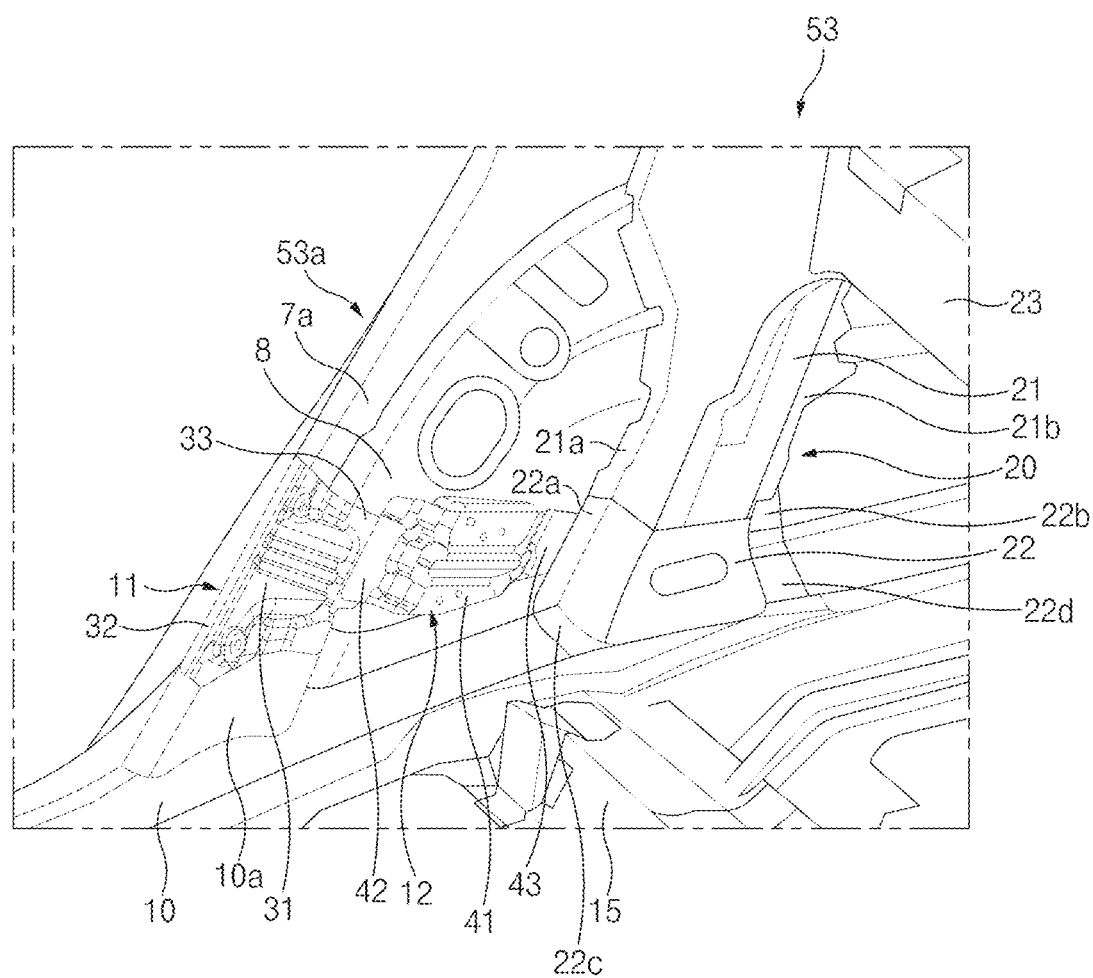
FIG. 9 illustrates a perspective view of a rear quarter section of a vehicle side structure according to another embodiment of the present disclosure, which is viewed from the interior of the vehicle.

According to another embodiment, the gusset 11 may be connected to the rear side member 10 through an extension portion 10*a* extending upwardly from the rear side member 10. Referring to FIG. 9, the rear side member 10 may have the extension portion 10*a* extending toward the rear portion of the rear impact beam 5. The gusset 11 may be integrally provided on the top of the extension portion 10*a*. A length of the extension portion 10*a* may be determined to allow the gusset 11 to overlap the rear portion of the rear impact beam 5. According to an embodiment, the gusset 11, the extension portion 10*a*, and the rear side member 10 may form a unitary one-piece structure by various manufacturing methods such as pressing and casting. According to another embodiment, the extension portion 10*a* and the rear side member 10 may form a unitary one-piece structure by various manufacturing methods such as pressing and casting. The gusset 11 may be fixed to the extension portion 10*a* using fasteners, welding, and/or the like.

The gusset 11 may be directly connected to the rear side member 10 or be connected to the rear side member 10 through the extension portion 10*a* so that an impact load may be transferred from the rear portion of the rear impact beam 5 to the rear side member 10 through the gusset 11. The rear side member 10 and the gusset 11 may bear the impact load.

As well-known in the art, an inboard surface of the rear quarter section 53 may be covered by a rear inboard trim (e.g., luggage side trim). Specifically, an inboard surface of the quarter inner panel 7*a* and an inboard surface of the wheel house inner panel 8 may be covered by the luggage side trim. The luggage side trim may be made of a synthetic resin material, and the quarter inner panel 7*a* and the wheel house inner panel 8 may be made of a metal material such as steel or aluminum. Since the gusset 11 and the reinforcing bracket 12 are not relatively thick, the gusset 11 and the reinforcing bracket 12 may be disposed between the inboard surface of the rear quarter section 53 and the rear inboard trim. Accordingly, since the gusset 11 and the reinforcing bracket 12 are covered by the rear inboard trim, they may not affect the rear interior of the vehicle, and may not cause inconvenience to occupants.

According to an embodiment, as illustrated in FIGS. 4 and 10, the reinforcing bracket 12 may include a stud bolt 49 provided on the center raised bead 45*a* of the front wall 45. A wire mounted on a floor may be fixed to the stud bolt 49 through a clip or the like.

According to another embodiment, at least one of the gusset 11 and the reinforcing bracket 12 may have one or more through holes. The wire mounted on the floor may pass through the through hole of the gusset 11 and/or the through hole of the reinforcing bracket 12. In this case, the stud bolt 49 attached to the reinforcing bracket 12 may be removed.

According to the above-described embodiments of the present disclosure, the gusset 11 may overlap the rear portion of the rear impact beam 5 so that the gusset 11, together with the flange 53*a* of the rear quarter section 53, may additionally support the rear portion of the rear impact beam 5. The rear portion of the rear impact beam 5 and the rear side door 3 are thereby prevented from intruding into the passenger compartment of the vehicle in the event of a side-impact crash of the vehicle.

As set forth above, according to embodiments of the present disclosure, when an impact load is applied to the rear impact beam during a side-impact crash of the vehicle, the impact load may be transferred through the gusset and the reinforcing bracket so that the rear portion of the rear impact beam may be firmly supported. Accordingly, the rear impact beam and the vehicle door may be prevented from intruding into the passenger compartment.

In particular, the gusset may be disposed to overlap the rear portion of the rear impact beam so that the gusset, together with the flange of the rear quarter section, may additionally support the rear portion of the rear impact beam. The rear portion of the rear impact beam and the rear side door are thereby prevented from intruding into the passenger compartment of the vehicle in the event of a side-impact crash of the vehicle.

Hereinabove, although the present disclosure has been described with reference to embodiments and the accompanying drawings, the present disclosure is not limited thereto. The embodiments of the present disclosure may be variously modified and altered by those having ordinary skill in the art to which the present disclosure pertains without departing from the spirit and scope of the present inventive concept claimed in the following claims.

What is claimed is:

1. A vehicle side structure, comprising:
   a rear impact beam mounted in a rear side door;
   a rear quarter section having a flange overlapping a rear portion of the rear impact beam; and
   a gusset at least partially overlapping the rear portion of the rear impact beam and the flange of the rear quarter section,
   wherein the rear quarter section includes a wheel house inner panel protruding toward a passenger compartment of the vehicle, and
   wherein the gusset is configured to connect the flange of the rear quarter section and the wheel house inner panel.

2. The vehicle side structure according to claim 1, wherein the gusset includes a reinforcing wall extending obliquely from the flange of the rear quarter section toward the wheel house inner panel.

3. The vehicle side structure according to claim 2, wherein the gusset further includes a front flange extending from the reinforcing wall toward the flange of the rear quarter section,
   the front flange extends along a longitudinal direction of the flange of the rear quarter section, and
   the front flange is fixed to the flange of the rear quarter section.

4. The vehicle side structure according to claim 2, wherein the gusset further includes a rear flange extending from the reinforcing wall toward the wheel house inner panel, and wherein the rear flange is fixed to the wheel house inner panel.

5. The vehicle side structure according to claim 2, wherein the gusset, the flange of the rear quarter section, and the wheel house inner panel form a closed cross-section.

6. The vehicle side structure according to claim 2, wherein the gusset further includes a recessed bead provided in the reinforcing wall, and wherein the recessed bead is recessed from the reinforcing wall toward the rear quarter section.

7. The vehicle side structure according to claim 1, further comprising a reinforcing bracket extending from the gusset toward the rear of the vehicle,
   wherein the reinforcing bracket is mounted on the wheel house inner panel.

8. The vehicle side structure according to claim 7, wherein the reinforcing bracket includes a reinforcing wall extending obliquely from a front portion of the wheel house inner panel toward a rear portion of the wheel house inner panel.

9. The vehicle side structure according to claim 8, wherein the reinforcing bracket further includes a front flange extending from a front edge of the reinforcing wall toward the gusset, and wherein the front flange is fixed to the gusset.

10. The vehicle side structure according to claim 8, wherein the reinforcing bracket further includes a rear flange extending from a rear edge of the reinforcing wall toward the rear portion of the wheel house inner panel, and wherein the rear flange is fixed to the rear portion of the wheel house inner panel.

11. The vehicle side structure according to claim 10, further comprising a support structure supporting the wheel house inner panel,
    wherein the rear flange of the reinforcing bracket is connected to a lower portion of the support structure.

12. The vehicle side structure according to claim 8, wherein the reinforcing bracket further includes a recessed bead provided in the reinforcing wall, and wherein the recessed bead is recessed from the reinforcing wall toward the wheel house inner panel.

13. The vehicle side structure according to claim 1, wherein the rear quarter section further includes a quarter inner panel forming a portion of the flange, and wherein the gusset is configured to connect the quarter inner panel and the wheel house inner panel.

14. The vehicle side structure according to claim 1, further comprising a rear side member connected to a lower portion of the rear quarter section, wherein the gusset is connected to the rear side member.

15. The vehicle side structure according to claim 1, wherein a rear portion of the rear impact beam is mounted on a rear portion of the rear side door through a bracket, and wherein the bracket and the gusset are aligned in a width direction of the vehicle.

\* \* \* \* \*